United States Patent
Kageyama

(10) Patent No.: US 10,133,022 B2
(45) Date of Patent: Nov. 20, 2018

(54) OPTICAL DEVICE

(71) Applicant: Nittoh Inc., Suwa-shi, Nagano (JP)

(72) Inventor: Takuya Kageyama, Nagano (JP)

(73) Assignee: Nittoh Inc. (JP)

( * ) Notice: Subject to any disclaimer, the term of this patent is extended or adjusted under 35 U.S.C. 154(b) by 108 days.

(21) Appl. No.: 15/353,408

(22) Filed: Nov. 16, 2016

(65) Prior Publication Data

US 2017/0059811 A1 Mar. 2, 2017

Related U.S. Application Data

(63) Continuation of application No. PCT/JP2015/061414, filed on Apr. 14, 2015.

(30) Foreign Application Priority Data

May 23, 2014 (JP) ................................ 2014-106856

(51) Int. Cl.
| | |
|---|---|
| G02B 15/14 | (2006.01) |
| G02B 7/10 | (2006.01) |
| G02B 7/08 | (2006.01) |
| G02B 7/105 | (2006.01) |

(52) U.S. Cl.
CPC .............. *G02B 7/10* (2013.01); *G02B 7/08* (2013.01); *G02B 7/105* (2013.01)

(58) Field of Classification Search
CPC ....................................................... G02B 7/10
USPC ........................................................ 359/700
See application file for complete search history.

(56) References Cited

U.S. PATENT DOCUMENTS

| | | |
|---|---|---|
| 2004/0190160 A1 | 9/2004 | Nishimura |
| 2010/0002309 A1 | 1/2010 | Nagae |
| 2012/0044579 A1* | 2/2012 | Tsuji ...................... G02B 7/102 |
| | | 359/700 |

FOREIGN PATENT DOCUMENTS

| | | |
|---|---|---|
| CN | 101620310 A | 1/2010 |
| JP | S58-103005 U1 | 7/1983 |
| JP | S63-210808 A | 9/1988 |
| JP | 2001-100081 A | 4/2001 |
| JP | 2004-302001 A | 10/2004 |
| JP | 2010-033048 A | 2/2010 |
| JP | 2013-257369 A | 12/2013 |

(Continued)

OTHER PUBLICATIONS

International Search Report (in Japanese) regarding corresponding Application No. PCT/JP2015-061414 dated Jul. 7, 2015 (9 pages).

*Primary Examiner* — James Jones
(74) *Attorney, Agent, or Firm* — Harness, Dickey & Pierce, P.L.C.

(57) ABSTRACT

An optical device includes a fixed tube that has a straight groove extending in a first direction parallel to an optical axis of the optical device, a cam ring that has a cam groove extending in a second direction intersecting to the first direction, a cam follower that is engaged with the straight groove and the cam groove, a lens unit that moves in conjunction with the cam follower in the first direction, and an auxiliary cam follower that is engaged with the straight groove and that is not engaged with the cam groove. When the fixed tube and the cam ring relatively rotate, the lens unit moves in the first direction. Further, the lens unit is fixed to the cam follower and the auxiliary cam follower.

12 Claims, 1 Drawing Sheet

(56) References Cited

FOREIGN PATENT DOCUMENTS

JP 2014-153618 A 8/2014

* cited by examiner

OPTICAL DEVICE

CROSS-REFERENCE TO RELATED APPLICATION

This application is a continuation of PCT Application No. PCT/JP2015/061414 filed Apr. 14, 2015 which claims priority to Japanese Patent Application No. 2014-106856 filed May 23, 2014 which are hereby expressly incorporated by reference herein in their entireties.

BACKGROUND

The present invention relates to an optical device.

A technology for an optical device that performs zooming and focusing is proposed by, for example, Japanese Patent Publication No. 2013-257369. Specifically, such the zooming and focusing are performed by moving a lens unit in an optical axis direction. The lens unit moves in the optical axis direction in conjunction with a cam follower that is engaged with a straight groove and a cam groove by rotating a cam ring in which the cam groove is formed relative to a fixed tube in which the straight groove is formed.

An object of Japanese Patent Publication No.2013-257369 is to provide an optical device that can smoothly perform the zooming and focusing with no influence on the optical performance at any relative angle between the straight groove and the cam groove. Further, in order to accomplish the purpose, the optical device is configured with an optical element, a first lens barrel, a second lens barrel, a cam ring, a first cam follower, a second cam follower, a fixed tube and an energization member. Specifically, the first lens barrel holds the optical element and moves in an optical axis direction of the optical element. The second lens barrel moves in the same direction as the first lens barrel as the first lens barrel moves. The cam ring is configured with first and second cam grooves that respectively displace the first and second cam followers in the optical axis direction. Specifically, the first and second cam followers are connected to the first and the second lens barrels, respectively. The fixed tube is configured with first and second straight grooves that respectively guide the first and second cam followers to the optical axis direction. The energization member that respectively energizes the first and second cam followers in in a direction intersecting the optical axis direction.

With respect to the technology described in Japanese Patent Publication No. 2013-257369, the energization member energizes the component in the direction intersecting the optical axis direction. When the configuration that used the energization member explained above is adopted, it makes the configuration of the optical device complicated, and further, it may cause a problem of such as a durability of the energization member.

SUMMARY

The present invention attempts to solve the problems explained above. An object of the present invention is to provide an optical device that can suppress influence on an optical performance at the time of movement in an optical axis direction of a lens unit with a simple configuration.

To achieve the above object, an optical device according to one aspect of the present invention includes: a fixed tube that has a straight groove extending in a first direction parallel to an optical axis of the optical device; a cam ring that has a cam groove extending in a second direction intersecting to the first direction; a cam follower that is engaged with the straight groove and the cam groove; a lens unit that moves in conjunction with the cam follower in the first direction; and an auxiliary cam follower that is engaged with the straight groove and that is not engaged with the cam groove. When the fixed tube and the cam ring relatively rotate, the lens unit moves in the first direction. Further, the lens unit is fixed to the cam follower and the auxiliary cam follower.

An optical device according to another aspect of the present invention includes: a cam ring that has a straight groove extending in a first direction parallel to an optical axis of the optical device; a fixed tube that has a cam groove extending in a second direction intersecting to the first direction; a cam follower that is engaged with the straight groove and the cam groove; a lens unit that moves in conjunction with the cam follower in the first direction; and an auxiliary cam follower that is engaged with the straight groove and that is not engaged with the cam groove. When the fixed tube and the cam ring relatively rotate, the lens unit moves in the first direction. Further, the lens unit is fixed to the cam follower and the auxiliary cam follower.

In the optical device according to the above aspects of the present invention, a center line of the fixed tube is the optical axis. The cam ring is in a tubular shape. Further, the cam ring is provided over an outer circumference surface of the fixed tube.

In the optical device according to the above aspects of the present invention, a center line of the cam ring is the optical axis. The cam ring rotates around the center line. Further, when the cam ring rotates, the lens unit moves along the optical axis.

In the optical device according to the above aspects of the present invention, an intersecting angle between the straight groove and the cam groove is 45 degrees or smaller.

The present invention can provide an optical device that can suppress influence on an optical performance at the time of movement in an optical axis direction of a lens unit with a simple configuration.

BRIEF DESCRIPTION OF THE DRAWINGS

FIG. 1 is also a plane view of an outer circumference surface of a cam ring on which the cam groove is formed.

DESCRIPTION OF EXEMPLARY EMBODIMENTS

Figure 1:
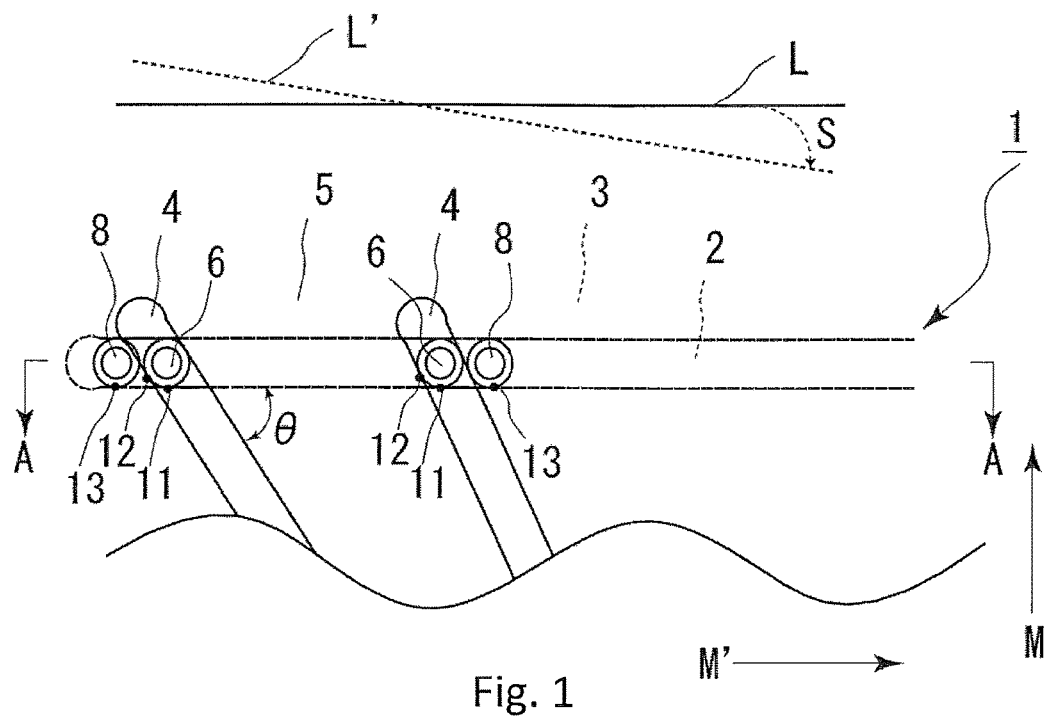
FIG. 1 is a diagram of an optical device that shows a state in which a cam follower is engaged with a straight groove and a cam groove according to an embodiment of the present invention. Further.
Figure 2:
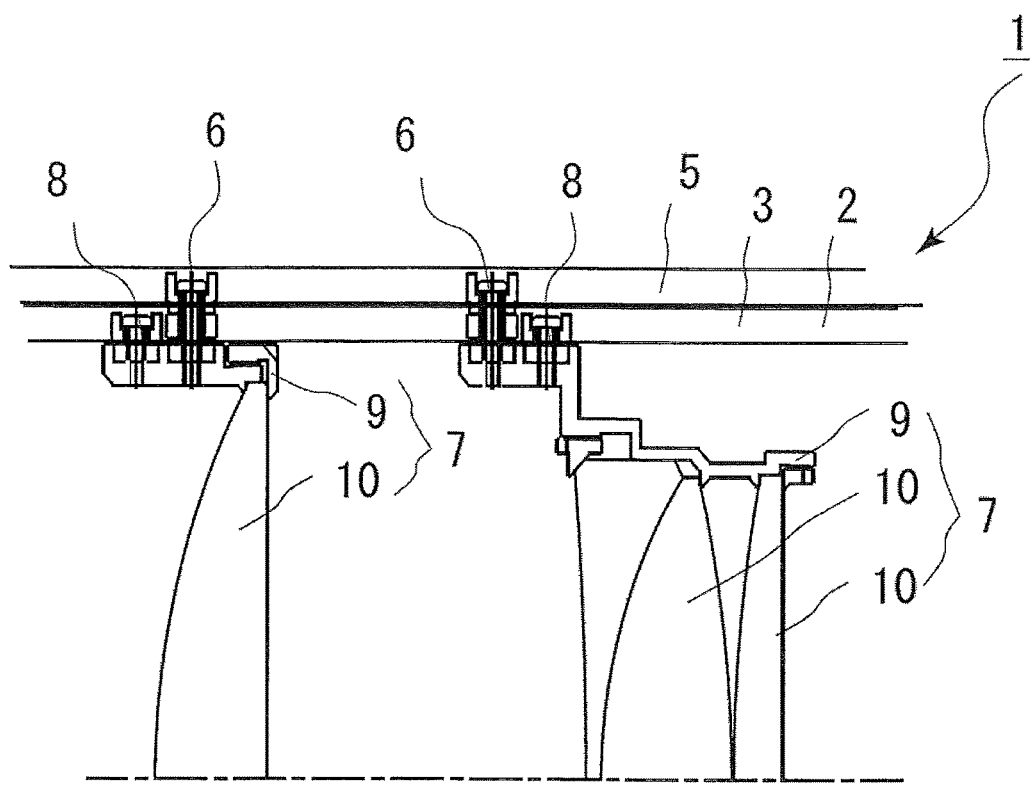
FIG. 2 is an A-A cross sectional view of the optical device shown in FIG. 1 according to the embodiment of the present invention.

An optical device according to an embodiment of the present invention will be explained below with reference to the drawings. FIG. 1 is a diagram of an optical device 1 that shows a state in which a cam follower 6 is engaged with a straight groove 2 and a cam groove 4 according to the embodiment of the present invention. Further, FIG. 1 is also a plane view of an outer circumference surface of a cam ring 5 on which the cam groove 4 is formed. FIG. 2 is an A-A cross sectional view of the optical device 1 shown in FIG. 1 according to an embodiment of the present invention.

The optical device 1 has a fixed tube 3 that is in a cylindrical shape. A center line of the fixed tube 3 is an optical axis L of the optical device 1. Further, a straight groove 2, which extends in a direction parallel to the optical axis L, is formed on the fixed tube 3. A cam ring 5 is in a cylindrical shape. A cam groove 4 is formed on the cam ring 5. A center line of the cam ring 5 is the optical axis L. Further, the cam ring 5 rotates relative to the fixed tube 3 with the center line of the cam ring 5 as a rotation axis. Further, the cam ring 5 is located so as to cover an outer circumference surface of the fixed tube 3 from an outside. By this rotation of the cam ring 5, a lens unit 7 moves in a direction along the optical axis L. Specifically, the lens unit 7 is fixed to and moves in conjunction with (in synchronization with) a cam follower 6 that is engaged with the straight groove 2 and the cam groove 4. The lens unit 7 is also fixed to and moves in conjunction with (in synchronization with) an auxiliary cam follower 8. The auxiliary cam follower 8 is fixed to and moves in conjunction with (in synchronization with) the cam follower 6. Further, the auxiliary cam follower 8 is inserted into the straight groove 2 and is not inserted into the cam groove 4.

Further, as shown in FIG. 2, the lens unit 7 has a support member 9 and a lens 10. The support member 9 supports the cam follower 6, the auxiliary cam follower 8 and the lens 10. According to the movement of the cam follower 6, the auxiliary cam follower 8, the support member 9 and the lens 10 (that is, the lens unit 7) move in conjunction with (in synchronization with) each other by the same direction and the same distance.

The straight groove 2 and the cam groove 4 intersect at an angle of θ=45° shown in FIG. 1. When a near side of the cam ring 5 shown in FIG. 1 rotates in a M direction while the fixed tube 3 is fixed, the lens unit 7 moves in a M' direction by a cam operation. At this time, a point where the fixed tube 3 contacts the cam follower 6 with the most strong force is a point 11 where the straight groove 2 presses the cam follower 6 shown in FIG. 1. Further, a point where the cam ring 5 contacts the cam follower 6 with the most strong force is a point 12 where the cam groove 4 presses the cam follower 6 shown in FIG. 1.

As explained above and shown in the lower left side of FIG. 1, when the cam follower 6 receives force from the two directions by the proximity of (by concentrating) the points 11 and 12, the lens unit 7 that is fixed to and moves in conjunction with (in synchronization with) the cam follower 6 receives a force for making the optical axis L incline in an arrow S direction (in a direction of the arrow S) shown in FIG. 1. Thus, the lens unit 7 tries to incline as, for instance, an optical axis L'. As a result, there is a problem that influences the optical performance when the lens unit 7 moves in the direction along the optical axis L. As an angle θ shown in FIG. 1 approaches 0°, the above trend becomes greater because the points 11 and 12 get closer.

However, because the auxiliary cam follower 8 is provided, it is possible to prevent the force, which causes the optical axis L tries to incline in the arrow S direction, from applying to the lens unit 7. Further, unlike the cam follower 6, because the auxiliary cam follower 8 is not inserted into the cam groove 4, the auxiliary cam follower 8 is inserted into the straight groove 2 without being affected by the contact of the point 12. In addition, the auxiliary cam follower 8 is fixed to and moves in conjunction with (in synchronization with) the lens unit 7. As a result, the auxiliary cam follower 8 tries to maintain a straight-traveling ability along the straight groove 2 against the force which causes the lens unit 7 tries to incline in the arrow S direction. Therefore, the posture of the lens unit 7 along the straight groove 2 can be easily maintained.

Further, by the existence of the auxiliary cam follower 8, when the near side of the cam ring 5 shown in FIG. 1 rotates in the M direction while the fixed tube 3 is fixed, positions where the fixed tube 3 presses are a point 13 where the straight groove 2 presses the auxiliary cam follower 8 and the point 11 where the straight groove 2 presses the cam follower 6. The above point 13 is added in addition to the point 11. Therefore, because the number of points that are pressed by the fixed tube 3 increases, the press force per point is made to be small. Further, by the existence of the auxiliary cam follower 8, the force that the cam follower 6 receives from the two directions is not concentrated and is dispersed. As a result, the force, which is provided to the lens unit 7 for making the optical axis L incline in the arrow S direction shown in FIG. 1, is hardly generated.

As explained above, the optical device 1 according to the embodiment of the present invention can suppress the influence on the optical performance without using an energization member, with the above novel contrivance of the members, and with a simple configuration when the lens unit 7 moves in the direction along the optical axis L.

The optical device 1 according to the embodiments of the present invention explained above is an example of the ideal embodiment of the present invention. Therefore, it will be apparent that the same may be varied in many ways. Such variations are not to be regarded as a departure from the spirit and scope of the invention, and all such modifications as would be apparent to one of ordinary skill in the art are intended to be included within the scope of the following claims.

For instance, as shown in FIGS. 1 and 2, the number of the auxiliary cam follower 8 is set to one, however, can also be two or more. Further, as shown in FIGS. 1 and 2, though the auxiliary cam follower 8 and the cam follower 6 are located adjacent to each other, it can also be adopted that they are separately located along the straight groove 2 with a distance. When the auxiliary cam follower 8 and the cam follower 6 are separately located with a distance, the force that the cam follower 6 is received from the two directions can be more dispersed. As a result, the force that is provided to the lens unit 7 for making the optical axis L incline in the arrow S direction is much hardly generated. However, from the point of view of miniaturization of the optical device 1, it is better to make the auxiliary cam follower 8 and the cam follower 6 close to each other.

Further, the straight groove 2 and the cam groove 4 crosses at the angle of θ=45°. However, this value of θ can be any value. The optical device 1 according to the embodiment of the present invention is particularly effective in case of having the angle of 45° or less as the value of θ in consideration of the incline of the optical axis L.

The cam ring 5 is located so as to cover the outer circumference surface of the fixed tube 3 from the outside. However, a configuration in which the fixed tube 3 is located so as to cover an outer circumference surface of the cam ring 5 from the outside can also be adopted. Further, it can also be possible that the straight groove 2 is formed on the cam ring 5 instead of the fixed tube 3, and the cam groove 4 is formed on the fixed tube 3 instead of the cam ring 5.

Further, in regards to the optical device 1 according to the embodiment of the present invention, because the cam ring 5 rotates from the near side shown in FIG. 1 in the M direction while the fixed tube 3 is fixed, the lens unit 7 moves in the M' direction by the cam operation. However, it can also be possible that by rotating the fixed tube 3 from the near side shown in FIG. 1 in the direction opposite to the M direction while the cam ring 5 is fixed, the lens unit 7 can also move in the M' direction by the cam operation.

What is claimed is:

1. An optical device comprising:
a fixed tube that has a straight groove extending in a first direction parallel to an optical axis of the optical device;
a cam ring that has a cam groove extending in a second direction intersecting to the first direction;
a cam follower that is engaged with the straight groove and the cam groove;
a lens unit that moves in conjunction with the cam follower in the first direction; and
an auxiliary cam follower that is engaged with the straight groove and that is not engaged with the cam groove,
wherein when the fixed tube and the cam ring relatively rotate, the lens unit moves in the first direction, and
the lens unit is fixed to the cam follower and the auxiliary cam follower.

2. The optical device according to claim 1,
wherein a center line of the fixed tube is the optical axis, and
the cam ring is in a tubular shape, and the cam ring is provided over an outer circumference surface of the fixed tube.

3. The optical device according to claim 2,
wherein a center line of the cam ring is the optical axis, and the cam ring rotates around the center line, and
when the cam ring rotates, the lens unit moves along the optical axis.

4. The optical device according to claim 1,
wherein an intersecting angle between the straight groove and the cam groove is 45 degrees or smaller.

5. The optical device according to claim 4,
wherein a center line of the fixed tube is the optical axis, and
the cam ring is in a tubular shape, and the cam ring is provided over an outer circumference surface of the fixed tube.

6. The optical device according to claim 5,
wherein a center line of the cam ring is the optical axis, and the cam ring rotates around the center line, and
when the cam ring rotates, the lens unit moves along the optical axis.

7. An optical device comprising:
a cam ring that has a straight groove extending in a first direction parallel to an optical axis of the optical device;
a fixed tube that has a cam groove extending in a second direction intersecting to the first direction;
a cam follower that is engaged with the straight groove and the cam groove;
a lens unit that moves in conjunction with the cam follower in the first direction; and
an auxiliary cam follower that is engaged with the straight groove and that is not engaged with the cam groove,
wherein when the fixed tube and the cam ring relatively rotate, the lens unit moves in the first direction, and
the lens unit is fixed to the cam follower and the auxiliary cam follower.

8. The optical device according to claim 7,
wherein a center line of the fixed tube is the optical axis, and
the cam ring is in a tubular shape, and the cam ring is provided over an outer circumference surface of the fixed tube.

9. The optical device according to claim 8,
wherein a center line of the cam ring is the optical axis, and the cam ring rotates around the center line, and
when the cam ring rotates, the lens unit moves along the optical axis.

10. The optical device according to claim 7,
wherein an intersecting angle between the straight groove and the cam groove is 45 degrees or smaller.

11. The optical device according to claim 10,
wherein a center line of the fixed tube is the optical axis, and
the cam ring is in a tubular shape, and the cam ring is provided over an outer circumference surface of the fixed tube.

12. The optical device according to claim 11,
wherein a center line of the cam ring is the optical axis, and the cam ring rotates around the center line, and
when the cam ring rotates, the lens unit moves along the optical axis.

* * * * *